United States Patent [19]

Nakamura et al.

[11] Patent Number: 4,914,946
[45] Date of Patent: Apr. 10, 1990

[54] VESSEL SPEED DETECTING DEVICE

[75] Inventors: Kazuhiro Nakamura; Tatsuya Yoshioka, both of Hamamatsu; Ryoji Sawada; Tomoji Nakamura, both of Iwata, all of Japan

[73] Assignee: Sanshin Kogyo Kabushiki Kaisha, Hamamatsu, Japan

[21] Appl. No.: 257,709

[22] Filed: Oct. 14, 1988

[30] Foreign Application Priority Data

Oct. 16, 1987 [JP] Japan .................. 62-259565

[51] Int. Cl.⁴ .............................................. G01C 21/10
[52] U.S. Cl. ........................................ 73/182; 340/984
[58] Field of Search ................. 73/181, 182, 183, 184, 73/185, 186, 187; 364/571.04; 340/984, 441

[56] References Cited

U.S. PATENT DOCUMENTS 4,205,552 6/1980 Refoy .................................... 73/182
4,821,567 4/1989 Nakamura et al. .................. 73/182

Primary Examiner—Donald O. Woodiel
Attorney, Agent, or Firm—Ernest A. Beutler

[57] ABSTRACT

A vessel speed indicating device including a semiconductor pressure detector that detects dynamic pressure and outputs a signal indicative of this pressure. A speed indicator and calculator is incorporated which senses when the speed is below a speed at which high accuracy can be expected and outputs a warning signal in the event of that condition. Alternatively, when the device is operating in a range where the speed signal is accurate, actual speed is indicated.

6 Claims, 4 Drawing Sheets

VESSEL SPEED DETECTING DEVICE

BACKGROUND OF THE INVENTION

This invention relates to a vessel speed detecting device and more particularly to an improved indicator arrangement for such devices.

A variety of devices have been proposed for use in indicating the speed of travel of a watercraft through the body of water in which it is operating. Such devices do not provide high degrees of accuracy under all conditions because of the many uncontrollable variables present in a watercraft. However, a type of watercraft speed indicating device that has been found to be very accurate over a wide range of watercraft speeds is disclosed in the copending application for U.S. Letters Patent entitled "Speedometer For Marine Vessels", Ser. No. 160,124, filed Feb. 25, 1988 in the name of Kazuhiro Nakahama et al, and assigned to the assignee of this application. In that type of device, there is provided an opening in the hull or some component associated with the hull against which dynamic water pressure acts. This water pressure is transmitted to a semiconductor pressure device that provides an output signal indicative of pressure and which can be related to watercraft speeds. Although this type of device has particular utility, there are certain disadvantages in that under low speeds, the accuracy or resolution of the device is not as good as could be desired. This is caused because the following equation expresses the relationship between dynamic pressure (P) and the watercraft speed (V):

$$V = \sqrt{a \cdot P + b/P + c}$$

Thus, as the watercraft speed is reduced, the ratio of watercraft speed to the increment of dynamic pressure varies along a curve having a configuration as best shown in FIG. 1.

However, this type of device generally cooperates with an analog to digital converter (ADC) that digitizes the output of the semiconductor pressure sensor by dividing it uniformly into a number of steps, such as 256 steps. Therefore, as the vessel speed becomes lower, the resolution of the ADC and detecting accuracy deteriorates. Furthermore, the low pressure level to be detected further gives rise to difficulties in correct speed indication.

Also, at low speeds, the dynamic pressure is unstable because of the response time lag caused by the inertia of the flowing water and the effect of temperature changes or so on can give rise to unreliable speed indication. Therefore, it is not an uncommon practice to calibrate the analog speed indicator so that speeds below a certain speed such as 20 kilometers per hour are not registered as shown by the indicator dial of FIG. 2.

It is, therefore, a principal object of this invention to provide an improved vessel speed detecting device and an indicating system therefor.

It is a further object of this invention to provide a vessel speed detecting device that indicates when the watercraft speed is below a speed at which the accuracy of the system is as good as desired.

SUMMARY OF THE INVENTION

This invention is adapted to be embodied in a speed detecting system for a watercraft that includes a dynamic pressure sensing device that provides a pressure signal. In accordance with the invention, this pressure signal is acted upon by a calculating circuit which provides a speed indication signal, if the device is operating in a range when the pressure is truly indicative of watercraft speed. At other speeds, the device indicates a signal that advises the operator that operation is in this other speed range.

DETAILED DESCRIPTION OF THE PREFERRED EMBODIMENT

Figure 3:
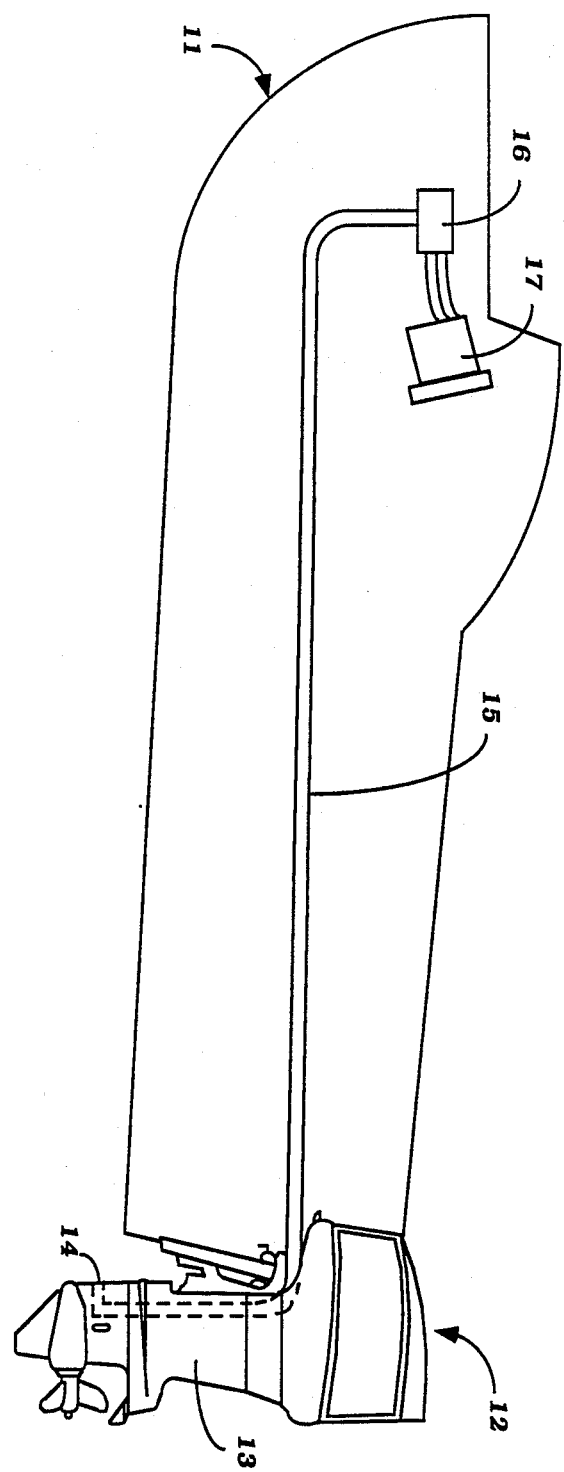
FIG. 3 is a side elevational view of a watercraft constructed in accordance with an embodiment of the invention.

Referring now to FIG. 3, a watercraft including a vessel speed detecting and indicating device constructed in accordance with an embodiment of the invention is identified generally by the reference numeral 11. The vessel 11 is powered by an outboard motor 12 that is mounted on the transom of the watercraft 11 in a known manner. The outboard motor 12 includes a lower unit, drive shaft housing 13 having a forwardly facing opening 14 that is adapted to experience dynamic water pressure upon travel of the watercraft 11 through a body of water. This sensed pressure is transmitted through a conduit shown schematically at 15 to a semiconductor pressure sensor 16 that outputs a signal indicative of pressure. This signal is transmitted to a combined speed calculator/speed indicator 17 that is positioned in proximity to the operator of the watercraft.

Figure 4:
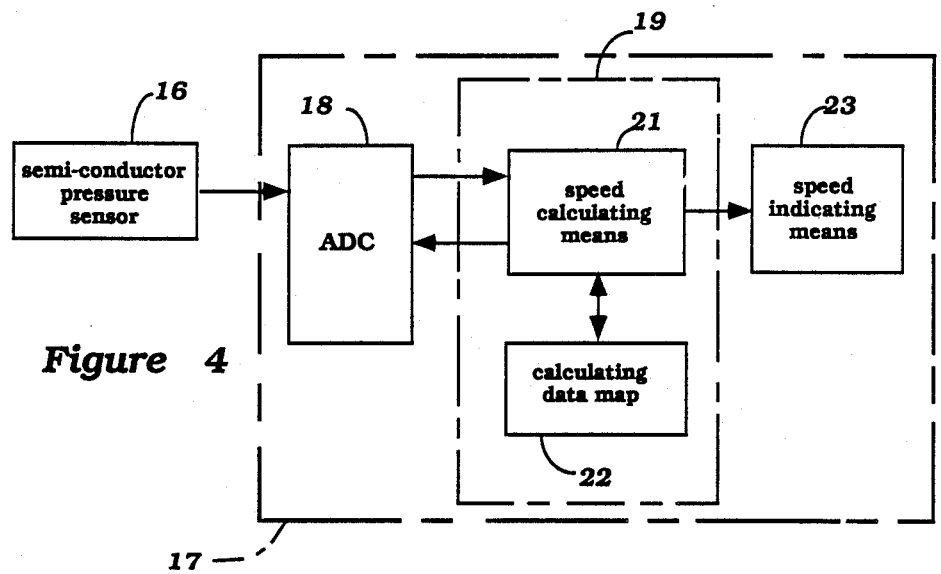
FIG. 4 is a schematic block diagram showing the components constructed in accordance with an embodiment of the invention.
Figure 6:
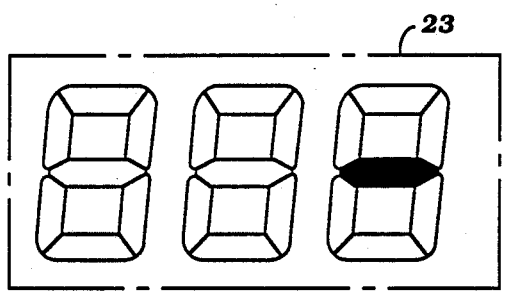
FIG. 6 is a view showing a digital indicator and the output signal generated by the device when operating in a speed range outside of the speed range at which the device has good accuracy.
Figure 7:
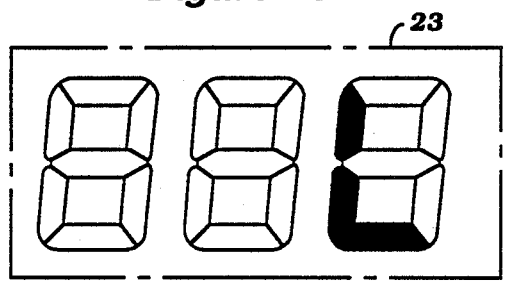
FIG. 7 is a view in part similar to FIG. 6 showing another form of indication.
Figure 8:
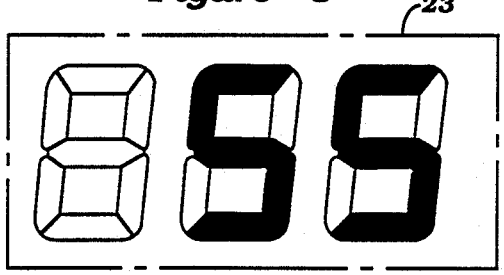
FIG. 8 is a view in part similar to FIGS. 6 and 7 showing actual speed indication during a range when the device is accurate.

Referring now to FIG. 4, it will be seen that the combined calculating and indicating device 17 includes an analog to digital converter 18 that converts the analog signal from the semiconductor pressure sensor 16 into a digital signal that is transmitted to a CPU 19 that includes a speed calculating arrangement 21 and calculating data map 22. The CPU 19 processes the digital signals from the converter 18 in the calculator 21 and outputs a speed signal or other signal, as described, to a speed indicating device 23 as calculated by comparison with the map 22. In the illustrated embodiment, the indicating device 23 is of the digital type and its various displays are shown in FIGS. 6 through 8. The display 23 may be of the liquid crystal type.

Figure 1:
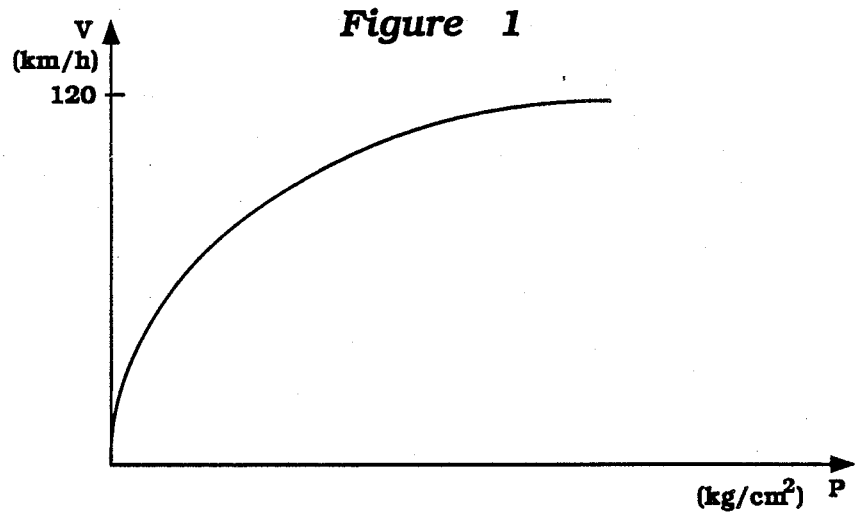
FIG. 1 is a graphical analysis showing the relationship between speed of the watercraft and sensed dynamic water pressure.
Figure 2:
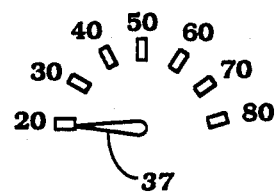
FIG. 2 is a view showing a conventional analog speed indicator constructed in accordance with the prior art.
Figure 5:
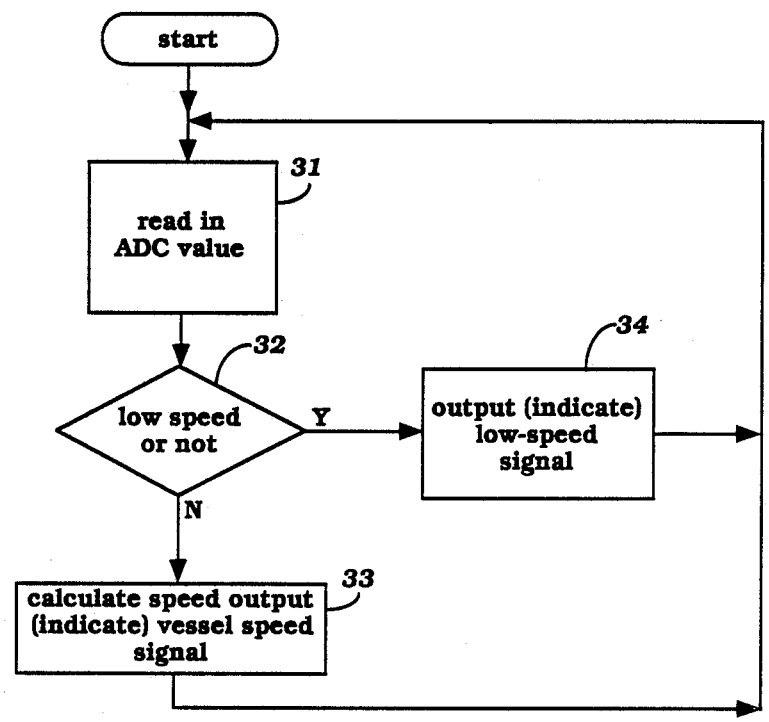
FIG. 5 is a flow chart showing the logic by which the speed indication signal is generated.

The program by which the speed indication is made may be understood by the flow diagram FIG. 5 wherein the calculating means 21 at the step 31 reads the digital signal output by the analog to digital converter 18. This read speed is then compared in a comparison step 32 with a predetermined low speed at which the accuracy of the device is not particularly acceptable. This is the area of the curve in FIG. 1 at low speeds and low pressures wherein the resolution is poor, as aforenoted. If the device is not at a low speed and is in the accurate range of the system, the actual speed is calculated at the step 33 and displayed in a display as shown in FIG. 8.

If, on the other hand, it is determined at the step 32 that there is a low speed condition when accuracy is not high, the program moves to the step 34 wherein the indicator 23 is provided with a signal indicative of this condition. This output signal may be of any type such as a minus sign as shown in FIG. 6 or the letter L as shown in FIG. 7 to indicate low speed. Any other type of display may be employed.

It should be apparent, therefore, from the foregoing description that a very simple and accurate vessel speed detecting device has been provided which will give the operator an indication when the watercraft is operating at a speed when the speed signal is not truly accurate. Although an embodiment of the invention has been illustrated and described, various changes and modifications may be made without departing from the spirit and scope of the invention, as defined by the appended claims.

We claim:

1. A vessel speed detecting device for a watercraft including dynamic pressure sensing means for providing an output signal indicative of dynamic pressure, speed calculating means for processing the output signal of said dynamic pressure sensing means to determine a watercraft speed, and means for providing an output signal indicative of a condition when the watercraft speed is so low that the speed signal is not accurate of actual watercraft speed.

2. A vessel speed detecting device as set forth in claim 1 wherein the display means indicates actual speed at other than the low speeds.

3. A vessel speed detecting device as set forth in claim 2 wherein the actual speed signal is digital.

4. A vessel speed detecting device as set forth in claim 1 further including means for providing a different form of output signal when the watercraft speed is above the speed at which the speed signal is accurate of actual watercraft speed.

5. A vessel speed detecting device as set forth in claim 4 wherein the other speed signal is an actual speed signal.

6. A vessel speed detecting device as set forth in claim 5 wherein the actual speed signal is a digital signal.

* * * * *